United States Patent
Ohtsuka et al.

(10) Patent No.: US 6,628,448 B2
(45) Date of Patent: Sep. 30, 2003

(54) OPTICAL SPECTRUM SLICER

(75) Inventors: Yoshihiro Ohtsuka, Yokohama (JP); Koji Horio, Yokohama (JP); Syumei Tokuyama, Yokohama (JP)

(73) Assignee: Moritex Corporation, Kanagawa (JP)

(*) Notice: Subject to any disclaimer, the term of this patent is extended or adjusted under 35 U.S.C. 154(b) by 214 days.

(21) Appl. No.: 09/905,074

(22) Filed: Jul. 16, 2001

(65) Prior Publication Data

US 2002/0048074 A1 Apr. 25, 2002

(30) Foreign Application Priority Data

Oct. 20, 2000 (JP) .................. 2000-320470

(51) Int. Cl.[7] .................. G02F 1/01; H04J 14/02; G02B 6/00
(52) U.S. Cl. .................. 359/240; 398/93; 398/95; 385/11
(58) Field of Search .................. 359/240, 256, 359/498; 385/11; 398/90, 93, 95

(56) References Cited

U.S. PATENT DOCUMENTS 6,496,611 B1 * 12/2002 Ohsuka .................. 385/11

2002/0048074 A1 * 4/2002 Ohsuka et al. .................. 359/256

FOREIGN PATENT DOCUMENTS

| CA | 2229219 A1 * | 8/1999 | .......... G01J/4/00 |
| CA | 2236521 A1 * | 8/1999 | .......... H04B/10/08 |
| JP | 200175051 | 3/2001 | .......... G02B/27/28 |
| JP | P2000-131698 A * | 5/2002 | .......... G02B/27/28 |

* cited by examiner

Primary Examiner—David N. Spector
(74) Attorney, Agent, or Firm—Greenblum & Bernstein, P.L.C.

(57) ABSTRACT

An optical spectrum slicer capable of converting and outputting discontinuous spectrum lights having spectral components at a desired wavelength spacing from a broad band continuous spectrum light, with a simple constitution and at a reduced cost, the slider comprising a birefringent device having two polarization axes each orthogonal to an optical axis (z) and linear polarizers disposed at the light incident end and the light emission end thereof, with the direction of polarization being inclined by about 45° relative to each of polarization axes, and a heat generator for controlling the temperature of the birefringent device thereby variably controlling each of wavelengths while maintaining the wavelength spacing of the discontinuous spectrum lights.

11 Claims, 9 Drawing Sheets

OPTICAL SPECTRUM SLICER

BACKGROUND OF THE INVENTION

1. Field of the Invention

The present invention concerns an optical spectrum slicer for outputting discontinuous spectrum lights containing multiple spectral components each at predetermined wavelength spacing from a broad band continuous spectrum light having a wavelength region of a predetermined range, which is suitable as a light source for inspection and evaluation of optical parts, devices and systems in the dense wavelength division multiplexing optical communication or a light source for use in optical communication.

2. Statement of the Related Art

In optical communication using optical fibers as signal transmission lines, TDM (time division multiplexing) transmission has been conducted so far with an aim of higher bit-rate transmission of a great amount of information and, recently, WDM (wavelength division multiplexing) transmission has been noted for transmitting a further great amount of information along with popularization of internets.

Figure 12:
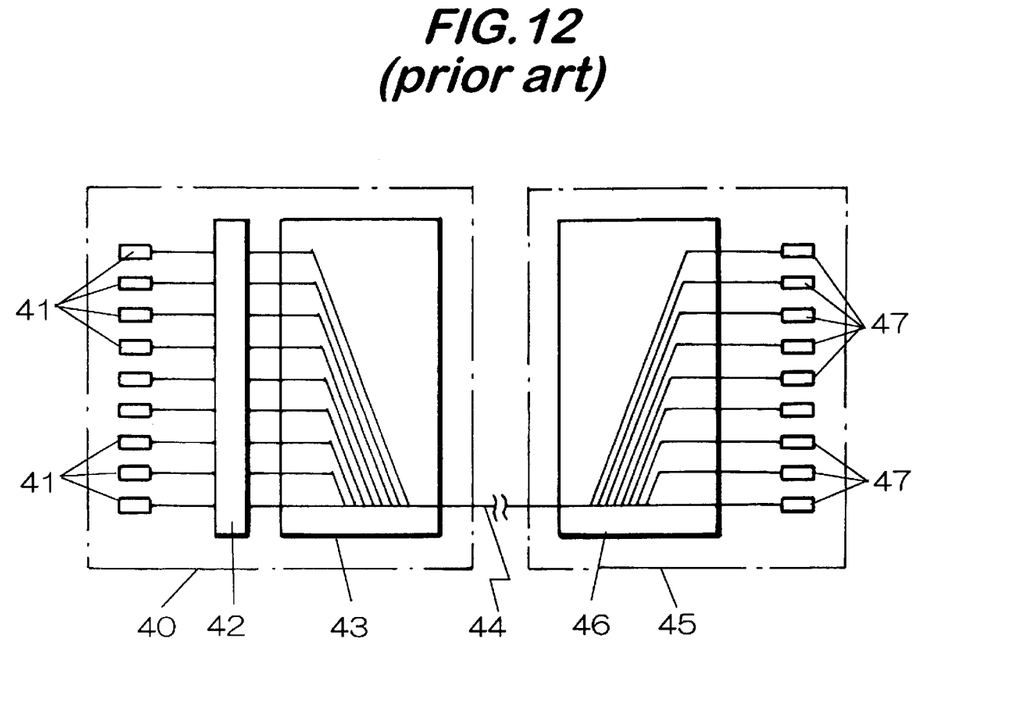
FIG. 12 is an explanatory view showing a usual WDM transmission system.

The WDM transmission is a mode for multiplexing transmission of a plurality of optical signals of different wavelengths by way of a single optical fiber. As shown in FIG. 12, optical signals from light sources 41, . . . of different wavelength are modulated by a modulator 42, and guided by an optical multiplexer 43 into a single optical fiber 44 on the transmission side 40, while an optical signal from the optical fiber 44 is separated on every wavelength by an optical demultiplexer 46, converted into electric signals by photo-receiving devices 45 and then demodulated and taken out on the receiving side 45.

At present, transmission of signals in several tens to one hundred channels independent of each other has been put to practical use by using a single optical fiber, which can provide advantages capable of bilateral transmission, transmission of different kinds of signals such as analog signals and digital signals simultaneously, and transmission of signals at high bit-rate and of large capacity while dividing them into channels each at low bit-rate and of small capacity, by the use of light of different wavelengths.

By the way, since lights of various wavelengths transmit through optical parts, devices and systems in the WDM optical communication, it is necessary to previously detect their optical characteristic on every wavelengths as to whether each of them has intended function to all of wavelengths used.

For example, in the system as shown in FIG. 12, if the wave separation characteristic of the demultiplexer 46 depends on the wavelength, there exist wavelengths that can be separated and those that can not be separated. Further, if the photoreceiving sensitivity of each of the photoreceiving devices 47 depends on the wavelength, there exist wavelengths that can be received at high sensitivity and can not be received at high sensitivity even for the lights of an identical intensity, so that it is not preferred in view of the WDM optical communication.

Then, lights at desired wavelengths are selectively take out, by controlling the wave length of a variable wavelength laser light source or transmitting a light outputted from an light emission diode through an interference filter, and discontinuous spectrum lights having a desired wavelength spacing are entered to the optical parts, devices and systems to previously detect the characteristics of the emission light.

However, since any one of the light sources described above can output only the light of a single wavelength, when a plurality of lights of different wavelengths are intended to be multiplexed, light sources are required by the number of channel, to increase the cost.

In a case of using a wavelength variable laser and converting the light into those of different wavelength while successively adjusting the wavelength different wavelength, it may suffice to use only one light source device. However, upon entering light while varying the wavelength, it takes much time for exactly matching to an optional wavelength and a long time is necessary for evaluation of characteristics regarding all the lights, for example, in 100 channels.

Further, in the WDM transmission, it is desirable to increase the density by setting the wavelength spacing between each of transmission lights to 1 nm or less (typically about 60 to 125 GHz by frequency spacing). However, even when the laser light sources are used by the number corresponding to the number of channels, it requires high level of technique and high cost to output discontinuous spectrum lights while controlling the spacing for the wavelength of adjacent laser lights at a high accuracy of 1 nm or less.

Further, since the interference filter for use in DWDM (dense wavelength division multiplexing) transmission has a multi-layered structure of 50 to 100 layers, it is not easy to design and manufacture the filter such that discontinuous spectrum lights can be outputted at the wavelength spacing of 1 nm or less between each of adjacent lights by controlling the thickness for each of the layers even to skilled manufacturers.

Then, if discontinuous spectrum lights at a predetermined wavelength spacing for use in WDM transmission can be obtained easily, optical characteristics (wavelength dependence) of optical parts, devices and systems used for the transmission system can be examined simply.

Figure 13:
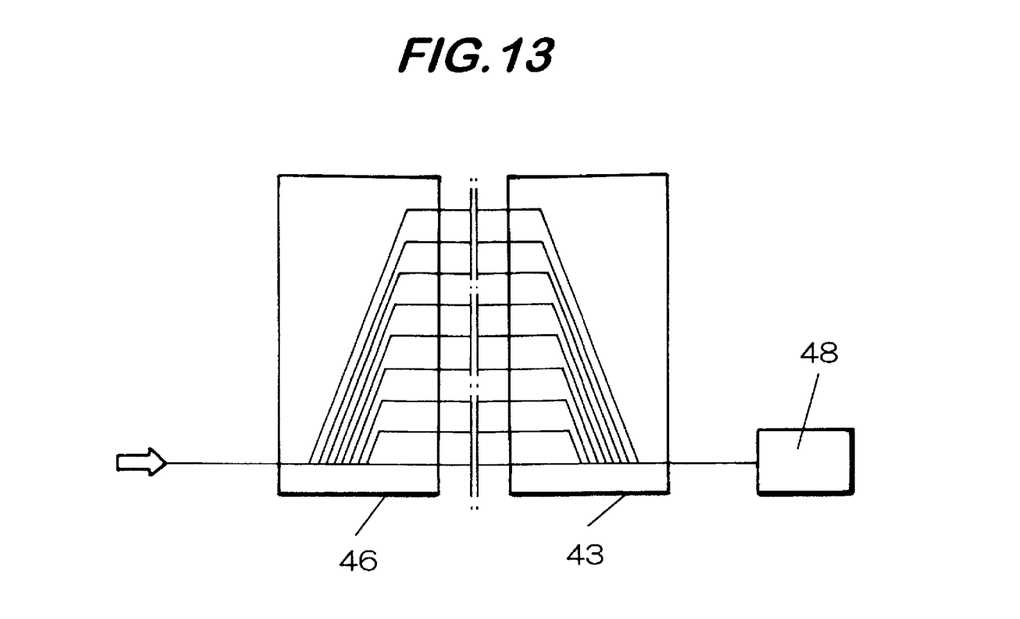
FIG. 13 is a view illustrating an optical system for checking a multiplexer and a demultiplexer.

For example, as shown in FIG. 13, when a multiplexer 43 is connected to the output of a demultiplexer 46 and discontinuous spectrum lights of known spectral characteristics are entered to the demultiplexer 46, optical characteristics of the multiplexer 43 and demultiplexer 46 can be checked easily.

In this case, when a demultiplexer 46 of known wavelength selectivity is used, the optical characteristics of the multiplexer 43 can be analyzed extremely simply. Further, when a multiplexer 43 of known wavelength selectivity is used, the optical characteristics of the demultiplexer 46 can be analyzed extremely easily.

OBJECT OF THE INVENTION

In view of the above, it is a technical subject of the present invention to provide an optical spectrum slicer capable of outputting discontinuous spectrum lights each at a desired wavelength spacing from a broad band continuous spectrum light in an extremely simple structure and at a reduced cost, without using special light sources or filters, and further capable of matching the wavelengths of the discontinuous lights to a desired wavelength spacing.

SUMMARY OF THE INVENTION

For solving the subject, the present invention provides an optical spectrum slicer for converting a broad band continuous spectrum light having an optional wavelength region into multiple discontinuous spectrum lights each at a predetermined wavelength spacing and outputting them comprising:

a birefringent device having two polarization axes each orthogonal to an optical axis and linear polarizers disposed at the light incident end and the light emission end of the birefringent device, with the direction of polarization being inclined by about 45° relative to each of the polarization axes, and a heat generator for variably controlling each of wavelengths while maintaining the wavelength spacing of the discontinuous spectrum lights by controlling the temperature of the birefringent device.

The term "direction of polarization" in the present specification means direction of vibration of a vibration vectors of an optical wave for light and means a direction along which the transmissibility of the linearly polarized light is maximum for the linear polarizer.

Further, the "frequency" is a function of "wavelength". Accordingly, if the term "wavelength" used for describing the constitution of the present invention is replaced with the term "frequency", this means an invention having quite technically equivalent constitution except for the expression of the term and, accordingly, such a reworded invention is also within the technical scope of the present invention.

According to the invention, when a broad band continuous spectrum light having an optional wavelength region, for example, between 800 to 3000 nm transmits the linear polarizer on the incident side, it is converted into a linearly polarized light at 45° direction and entered to the birefringent device to form an x-polarized light and a y-polarized light each transmitting along the optical axis, in which the light intensity is identical between both of the polarized light components.

Since the refractive indexes $n_x$ and $n_y$ of the birefringent device are different with respect to the two polarization axes, a difference in the velocity is caused between the x-polarized light and the y-polarized light to form a phase difference at the emission end.

Accordingly, when the lights transmit the linear polarizer on the emission side, 45° components of the x-polarized light and the y-polarized light are synthesized, and the identical spectral components interfere with each other, so that a comb type spectrum having spectral components at a predetermined wavelength spacing can be observed in the spectral region by wavelength scanning of the emission light by a spectral analyzer or the like.

Further, according to the experiment made by the present inventors, when the temperature for a birefringent device is elevated, the wavelength (frequency) can be shortened (made higher) while maintaining the wavelength spacing (frequency spacing) constant for each of spectral components in the comb spectrum. On the contrary, when the temperature of the birefringent device is lowered, the wavelength (frequency) can be made longer (made lower) while maintaining the wavelength spacing (frequency spacing) constant for each of spectral components in the comb spectrum.

For example, when the wavelength for each light upon WDM transmission is set to 1 nm spacing around 1550.0 nm as the center in a 1530–1600 nm band including C-band and L-band, if the wavelength of the discontinuous spectrum light outputted from the optical spectrum slicer is at 1 nm spacing around 1549.8 nm as the center, each wavelength can be made longer by 0.2 nm while keeping the 1 nm wavelength spacing thereby matching to the set wavelength by lowering the temperature for the birefringent device.

According to a second feature of the invention, since a pair of optical connectors to be connected with an optical fiber for entering a broad band continuous spectrum light and an optical fiber for emitting discontinuous spectrum lights are attached to both ends of a housing incorporating the birefringent device, with the optical axis being aligned with the optical axis of the birefringent device, they can be incorporated into the communication system by merely connecting the optical fiber to each of the optical connectors with no troublesome alignment for the optical axis.

According to a third feature of the invention, a reflection mirror is disposed for reflecting a light emitted from the birefringent device and transmitting the polarizer along the optical axis and entering the same again by way of the polarizer to the birefringent device.

In this case, an optical channel reciprocating in one birefringent device is formed and discontinuous spectral lights having more sharpened comb spectrum are outputted.

According to a fourth feature of the invention, since an optical connector for connecting an optical fiber used both for entering and emission is attached with an optical axis being aligned with the optical axis of the birefringent device, they can be incorporated into the communication system by merely connecting the optical fiber to each optical connector with no troublesome alignment for the optical axis.

According to a fifth feature of the invention, a wavelength of an optional light contained in discontinuous spectrum lights is detected and compared with a predetermined reference wavelength and the temperature of the heat generator is put to feedback control such that they are identical with each other by a wavelength controller.

According to this constitution, when the wavelength of multiple wavelength lights interfering to each other by emission from the birefringent device and transmission through the polarizer is displaced from the desired reference wavelength, feedback control is applied such that they are identical with each other to control the temperature of the birefringent device, so that discontinuous spectrum lights containing spectral components of a reference wavelength can be obtained.

DESCRIPTION OF PREFERRED EMBODIMENTS

Preferred embodiments of the present invention are to be explained in details with reference to the drawings.

Figure 1:
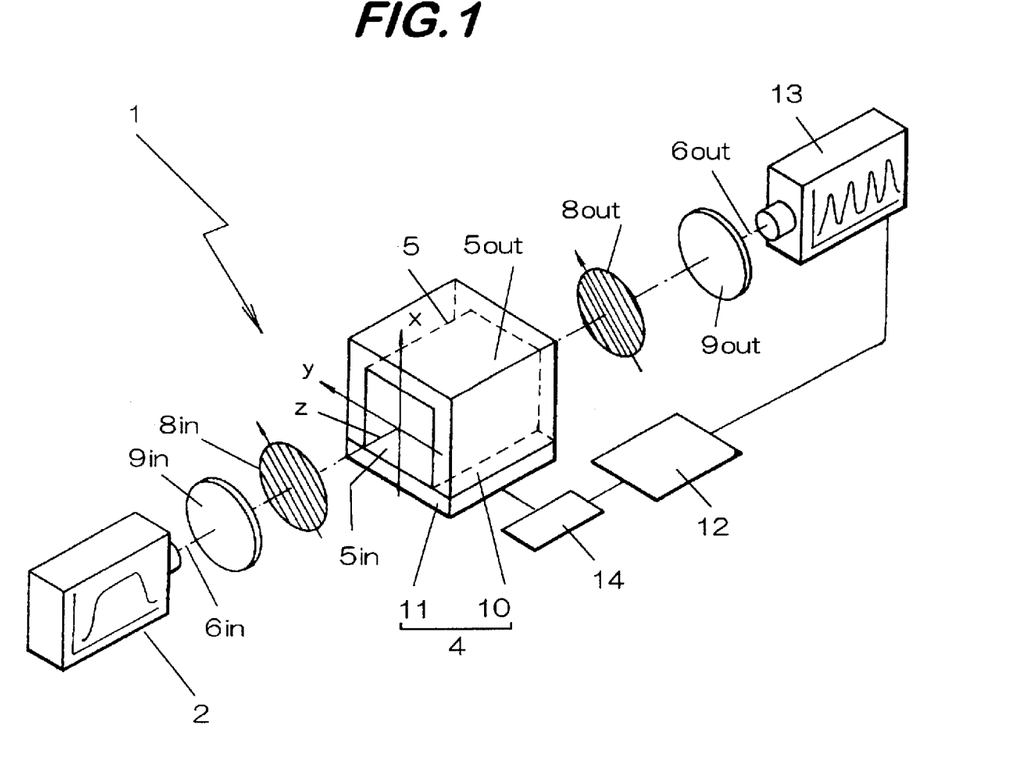
FIG. 1 is an explanatory view for the basic constitution of a multichannel optical spectrum slicer according to the present invention.

A multichannel optical light spectrum slicer 1 shown in FIG. 1 is adapted so as to output discontinuous multiple wavelength lights each at a predetermined wavelength spacing from a light emission end when a light having an optional wavelength region, for example, between 800 and 3000 nm wavelength is entered from a broad band spectrum light source 2, such as ASE (Amplified Spontaneous Emission) or an SLD (Super Luminescent Diode).

As the basic constitution, a birefringent device 5 such as made of rutile surrounded at the circumferential surface with a heat generator 4 is incorporated in a housing 3, and a pair of optical connectors 7in and 7out for connecting an optical fiber 6in for entering a broad band continuous spectrum light and an optical fiber 6out for emitting discontinuous spectrum light are formed coaxially with the optical axis z.

Linear polarizers 8in and 8out are disposed in the optical connectors 7in and 7out facing an optical incident end 5in and an optical end 5out of the birefringent device 5 in the optical connector 7in and 7out, and collimator lenses 9in and 9out are disposed being faced to optical fibers 6in and 6out to be connected.

Further, each of the polarizers 8in and 8out is disposed such that the direction of polarization is inclined by about 45° relative to each of the polarized light axes x, y perpendicular to the optical axis z of the birefringent device 5.

Therefore, since the light transmitting the polarizer 8in forms a linear polarized light inclined by about 45° relative to the polarization axis x, y of the birefringent device 5, the x-polarized component and the y-polarized component are identical in view of the light intensity and, accordingly, the intensity of lights propagating along the polarized axes x, y of the birefringent device 5 is identical.

Further, the x-polarized light and the y-polarized light emitted from the birefringent device 5 are synthesized regarding respective 45° components with each other by transmitting the polarizer 8out disposed to the emission end thereof and identical spectral components interfere with each other.

The heat generator 4 comprises a heat conductive support 10 made of copper having a tunnel-shaped light permeating channel 10a for supporting the birefringent device 5 and a Peltier device 11 for heating the birefringent device 5 by heating the heat conductive support 10, and the Peltier device 11 is connected to a wavelength controller 12.

The wavelength controller 12 is constituted with a computer in which a spectrum analyzer 13 for monitoring the discontinuous spectrum lights is connected to the input and a driver 14 for the Peltier device 11 is connected at the output thereof.

Figure 3:
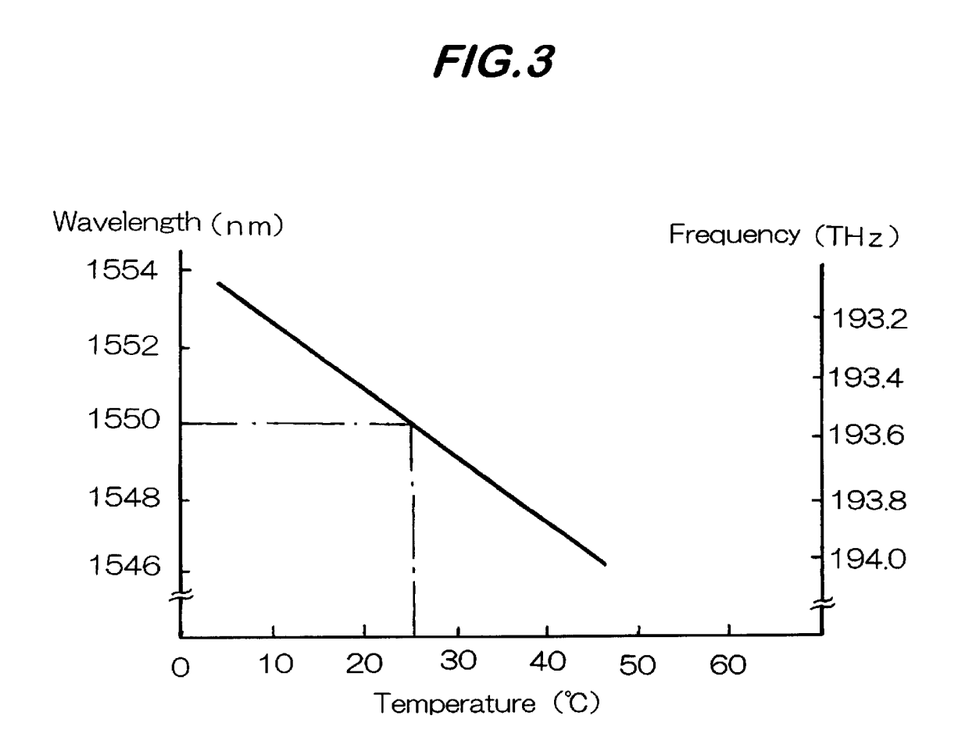
FIG. 3 is a graph of temperature-wavelength (frequency)

FIG. 3 shows a temperature-wavelength (frequency) graph and it can be seen from the graph that the wavelength is shortened each by 0.16 nm/° C. and frequency is made higher each by 20 GHz/° C. along with elevation of the temperature of rutile used as the birefringent device 5 in this embodiment.

Figure 4:
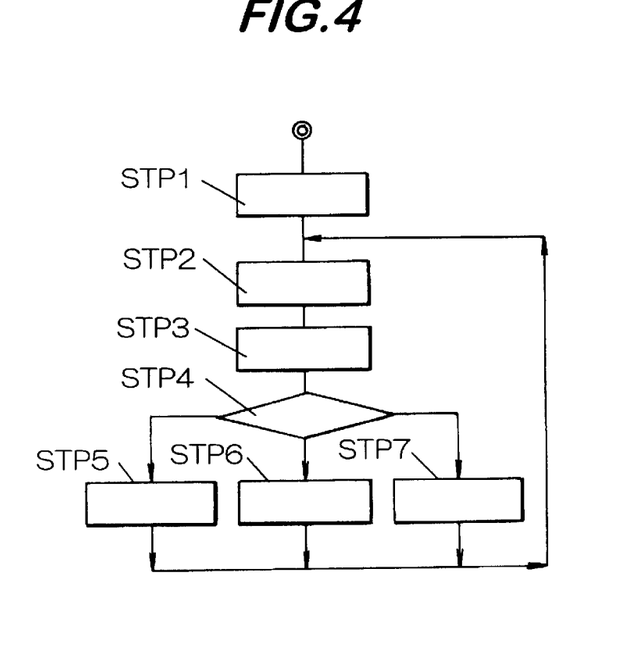
FIG. 4 is a flow chart illustrating the processing procedures of a wavelength controller.

FIG. 4 shows the processing procedures in the wavelength controller 12. When a switch (not illustrated) is turned on, a control signal for setting the Peltier device 11 to a reference temperature $T_0$ (for example 25° C.) is outputted at first at step STP1 and the spectrum light source 2 is lighted up and a broad band continuous spectrum light is entered by way of the optical fiber 6in to the optical spectrum slicer 1.

Then, at step STP2, the discontinuous spectrum lights outputted from the optical spectrum slicer 1 are detected by the spectrum analyzer 13 and the wavelength $\lambda_1$ for the spectral component having a peak $P_1$ at a position nearest to a predetermined reference wavelength (for example, $\lambda_0$=1550 nm) is detected at step STP3 based on the spectral chart.

At step STP4, the reference wavelength $\lambda_0$ and the detected wavelength $\lambda_1$ are compared and, when the detected wavelength $\lambda_1$ is greater than the reference wavelength $\lambda_0$, the process goes to step STP5, to lower the temperature of the Peltier device 11 by a minimum controllable temperature. When the detected wavelength $\lambda_1$ is smaller than the reference wavelength $\lambda_0$, the process goes to step STP6 to elevate the temperature of the Peltier device 11 by a minimum controllable temperature. When both of them are identical, the process goes to step STP7 to maintain the temperature. The process returns from each of the steps STP5–7 to STP2 and the processings are repeated.

With the processings described above, the wavelength for each spectral component of the discontinuous spectrum lights changes by an identical value, while the wavelength spacing being kept constant, and discontinuous spectrum lights containing the spectral component of the standard wavelength $\lambda_0$ are outputted.

The frequency spacing $v_P$ for the discontinuous spectrum lights outputted from the optical spectrum slicer 1 is determined based on the birefringence $\Delta n = n_x - n_y$ and the length L of the birefringent device 5 in accordance with the equation:

$$v_P = c/(\Delta n \times L)$$

The wavelength spacing $\lambda_p$ is determined as:

$$\lambda_p = (\lambda^2/c) v_P$$

where $\lambda$ represents the central wavelength of the entered broad band continuous spectrum light.

Accordingly, in a case where discontinuous spectrum lights at a wavelength spacing $\lambda_p$=1 nm (frequency spacing $v_P$=125 GHz) are intended to be outputted by using rutile ($\Delta n$=0.26) as the birefringent device 5, the optical spectrum slicer 1 is formed by determining the length L=0.2 mm for the birefringent device 5 used in accordance with the equation described above.

A continuous spectrum light from 1530 to 1650 nm is inputted from a broad band continuous spectrum optical source 2 such as ASE to the optical spectrum slicer 1 and outputted discontinuous spectrum lights are detected by the spectrum analyzer 13.

Figure 5:
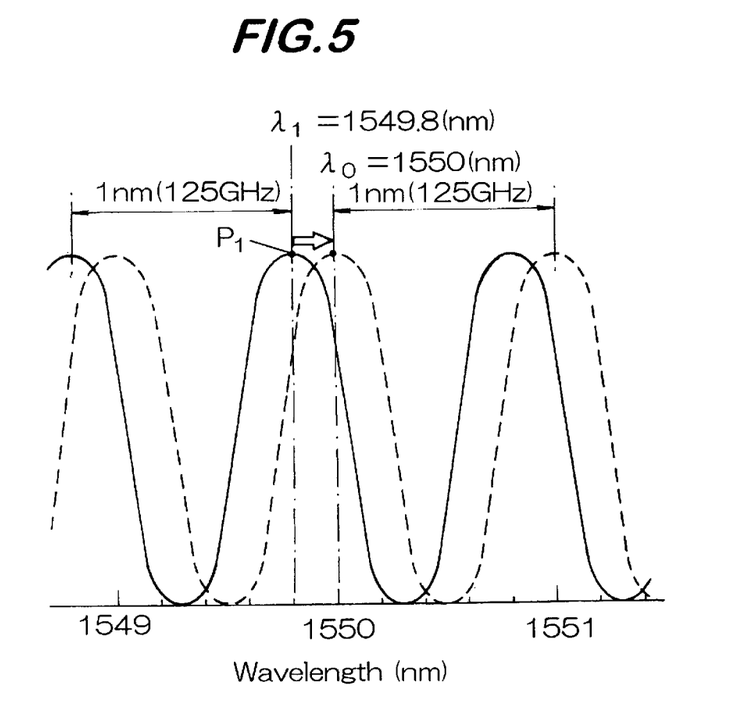
FIG. 5 is a graph showing an analyzed output spectrum of emitted light.

FIG. 5 shows detected spectrum and it can be seen that the wavelength spacing $\lambda_1$=1 nm (frequency spacing $v_P$=25 GHz) and that the wavelength closest to the standard wavelength $\lambda_p$=1550 nm is 1549.8 nm.

Accordingly, when the amount of current supplied to the Peltier device 11 is controlled to lower the temperature by 1.25° C., the wavelength is made longer by about 0.2 nm and the spectrum waveform shifts rightward to match the set wavelength (shown by dotted line in FIG. 5).

Since the temperature change of the Peltier device 11 and the wavelength change are not always stabilized, for example, due to the effect of the ambient temperature, it is preferred to feedback control the temperature of the Peltier device 11 based on the outputted discontinuous spectrum lights.

Figure 6A:
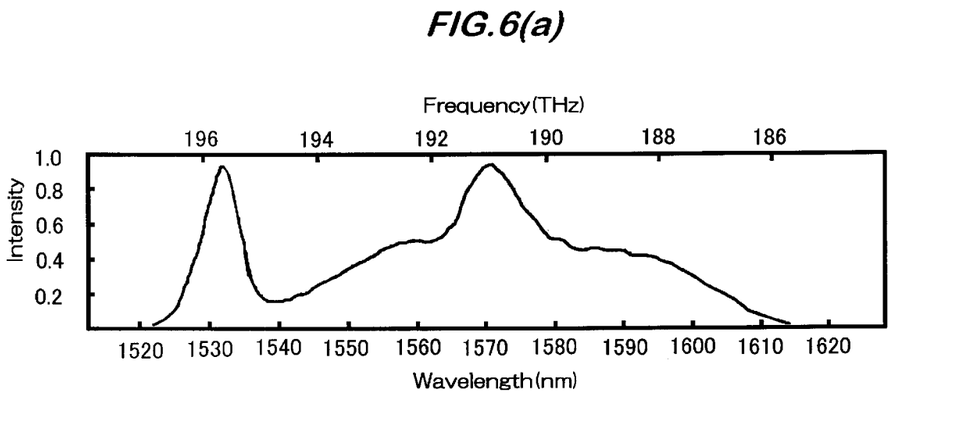
FIGS. 6(a) and 6(b) are spectrum charts for input/output light.
Figure 6B:
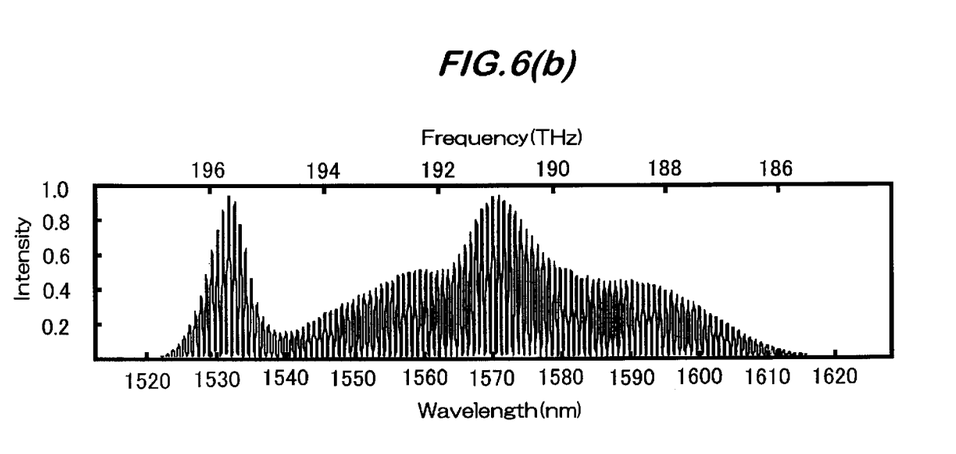
Figure 7:
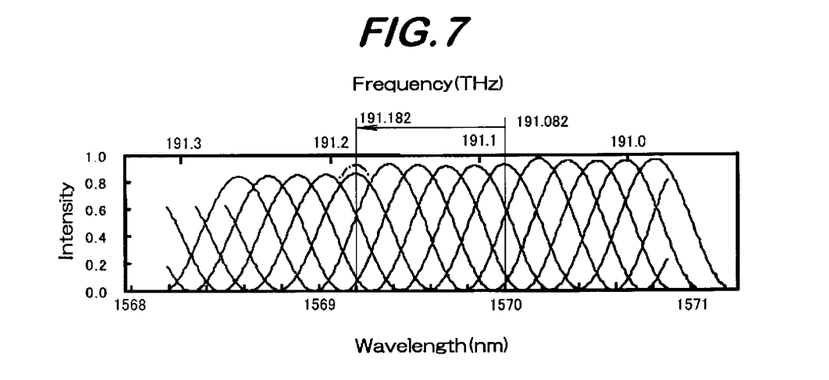
FIG. 7 is a spectrum chart illustrating temperature change of the output light.
Figure 8:
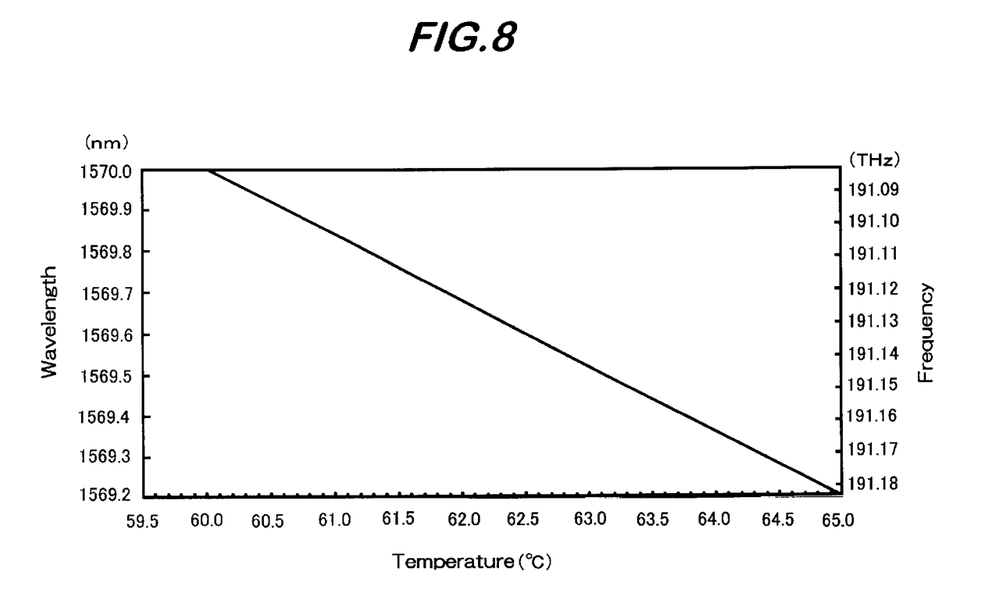
FIG. 8 is a graph of temperature-wavelength (frequency)

FIG. 6 to FIG. 8 show the result of experiment for the optical spectrum slicer 1 using birefringent devices 5 of different length.

In this embodiment, the length of the birefringent device 5 ($\Delta n=0.26$) is set as: L=11.54 mm and the birefringent device 5 is maintained at 60° C. by the Peltier device 11 and a continuous spectrum light having a spectral distribution shown in FIG. 6(a) is entered such that discontinuous spectrum lights at a wavelength spacing $\lambda_p=0.8$ nm (frequency spacing $\nu_P=100$ GHz) can be outputted.

When the outputted light is analyzed by the spectral analyzer, a spectral waveform as shown in FIG. 6(b) is obtained and it can be seen that discontinuous spectrum lights at a wavelength spacing $\lambda_p=0.8$ nm (frequency spacing $\nu_P=100$ GHz) can be obtained from the continuous spectrum light.

Then, the temperature of the birefringent device 5 was changed between 60 and 65° C. by controlling the amount of current supplied to the Peltier device 11.

FIG. 7 is a spectral chart showing the change of the waveform on every 1° C. between 60 and 65° C. and FIG. 8 is a temperature-wavelength (frequency) graph when tracing a light at the wavelength of 1570 nm.

From the graph, it can be seen that the wavelength (frequency) changes for one wavelength spacing at 5° C. ($\lambda_p=0.8$ nm, frequency spacing $\nu_P=100$ GHz) for 5° C. and, accordingly, the light can be set freely to an optional wave form by applying temperature control within the range.

Figure 2:
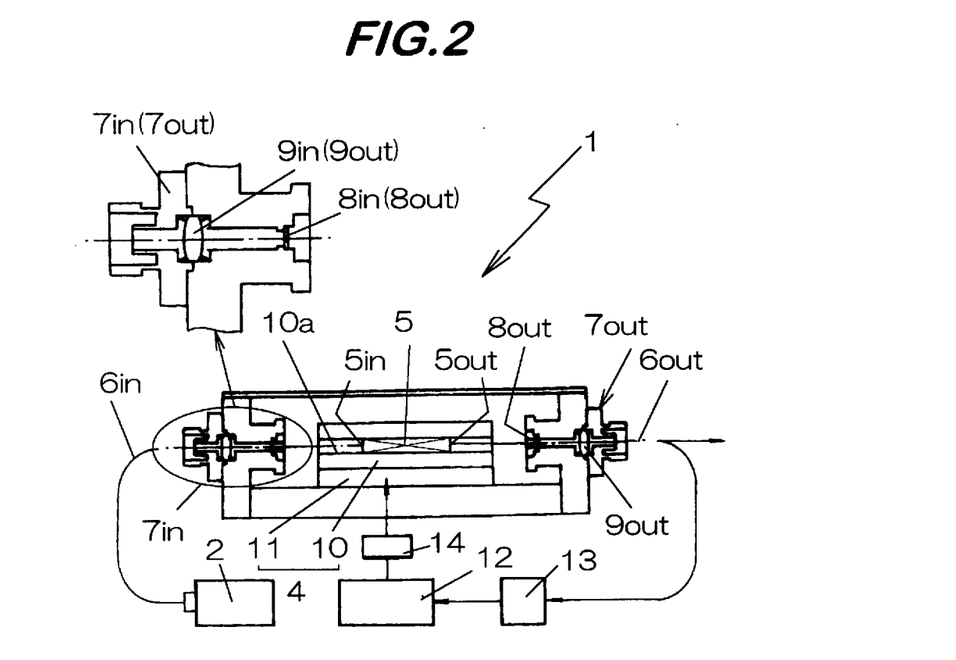
FIG. 2 is a cross sectional view illustrating an actual device thereof.
Figure 9:
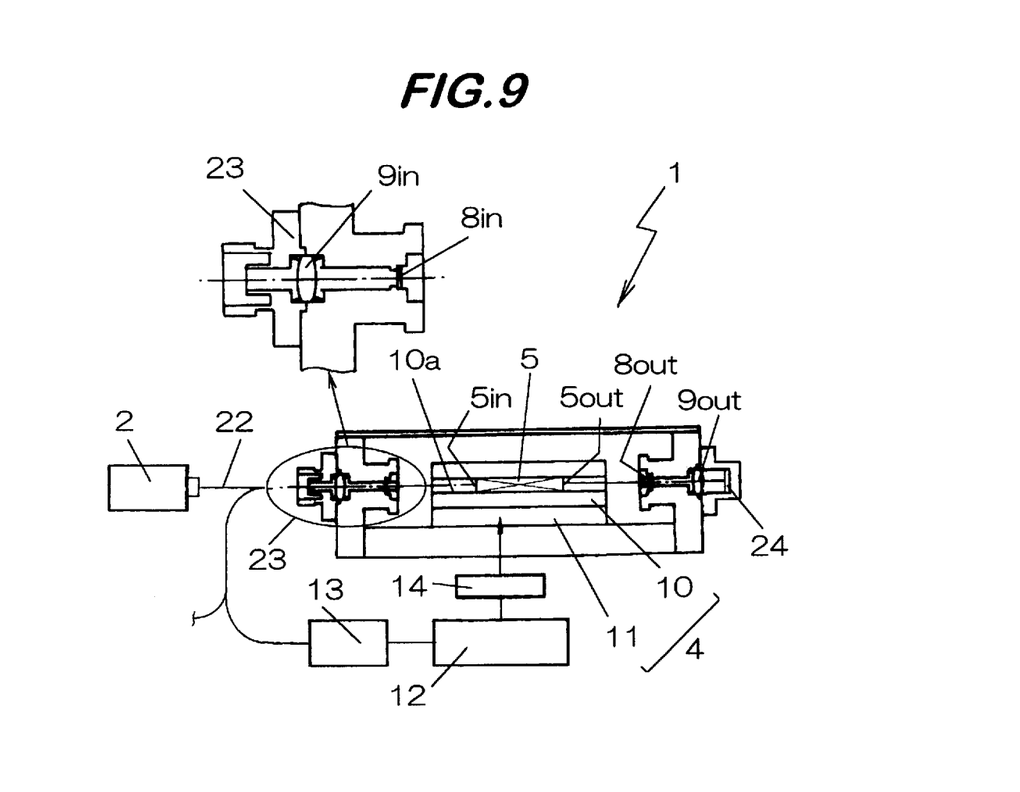
FIG. 9 is a cross sectional view illustrating another embodiment of the present invention.

FIG. 9 shows another embodiment in which portions in common with those shown in FIG. 1 and FIG. 2 carry identical reference numerals, for which explanations are to be omitted.

In this embodiment, light entered from one end 5a of a birefringent device 5 is reflected on the other end 5b, reciprocated in the birefringent device and then emitted from the one end 5a.

Specifically, an optical connector 23 for connecting an optical fiber 22 for both input and output use is formed at one end 5a of the birefringent device 5 incorporated in a housing 21, and a reflection mirror 24 is disposed on the other end 5b for reflecting a light emitted passing through a polarizer 8out and again entering the same by way of the polarizer 8out into the birefringent device 5.

Thus, a reciprocal optical channel is formed in the birefringent device 5 and discontinuous spectrum lights transmitting the birefringent device 5 and outputted from the other end 5b is reflected at the reflection mirror 24, passes again through the birefringent device 5 and then outputted from one end 5a of the birefringent device 5.

The spectrum is compressed to form ideal discontinuous spectrum lights with less cross talk.

Figure 10:
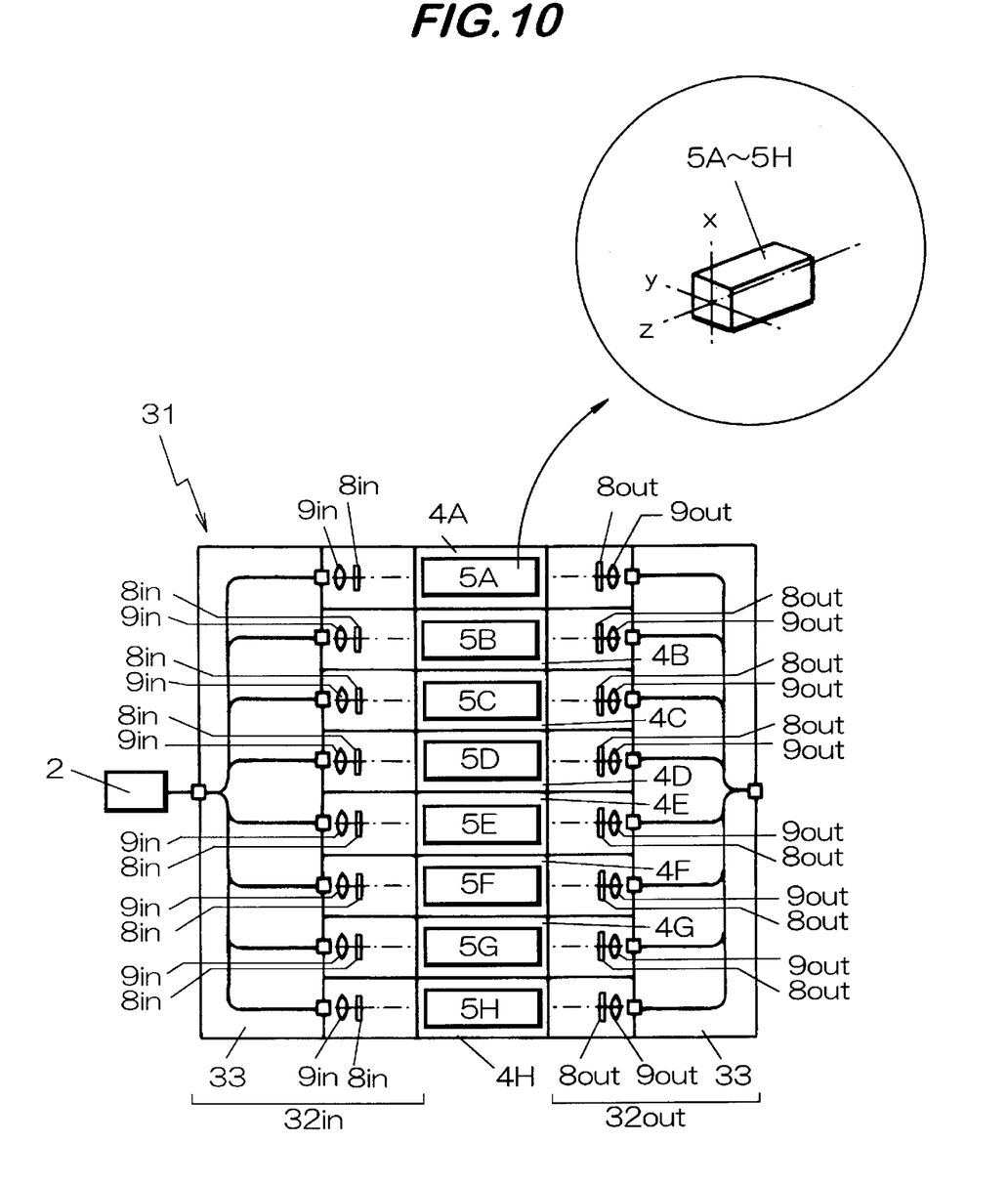
FIG. 10 is a cross sectional view illustrating a further embodiment of the present invention.

FIG. 10 shows a further embodiment. an optical spectrum slicer 31 in this embodiment is adapted to convert a broad continuous spectrum light having an optional wavelength region into multiple discontinuous spectrum lights different wavelength spacings and outputting the same. Portions in common with those in FIG. 1 carry the same reference numerals for which detailed description are to be omitted.

The optical spectrum slicer 31 of this embodiment comprises eight birefringent devices each having two polarization axes x, y perpendicular to the optical axis z, and the birefringent devices 5A to 5H are set to such length that they can output discontinuous spectrum lights at eight different wavelength spacings on every 0.08 nm for the wavelength spacing from 0.24 nm to 0.8 nm (on every 10 GHz for the frequency spacing from 30 GHz to 100 GHz).

Each of the birefringent devices 5A–5H has two polarization optical axes x, y perpendicular to the optical axis z, linear polarizers 8in and 8out are disposed to the light incident end 5in and light emitting end 5out respectively, with the direction of the polarization being inclined by about 45° relative to the polarization axes x and y, and the devices 5A to 5H comprise heat generators 4A to 4H, respectively, which can control the temperature on every individual birefringent devices 5A to 5H to variably adjust each of the wavelengths while maintaining the wavelength spacing of the discontinuous spectrum lights.

The optical spectrum slicer 31 comprises an incident optical system 32in for entering a broad band continuous spectrum light irradiated from an optical source 2 to each of the birefringent devices 5A to 5H and an emitting optical system 32out for emitting discontinuous spectrum lights formed through each of the birefringent devices 5A to 5H.

Optical branching devices 33, 33 for conducting 1:8 and 8:1 optical branching are used for the incident optical system 32in and the emitting optical system 32out and, when a light source 2 is lighted up, eight kinds of discontinuous spectrum lights of different wavelength spacings are outputted simultaneously.

Figure 11A:
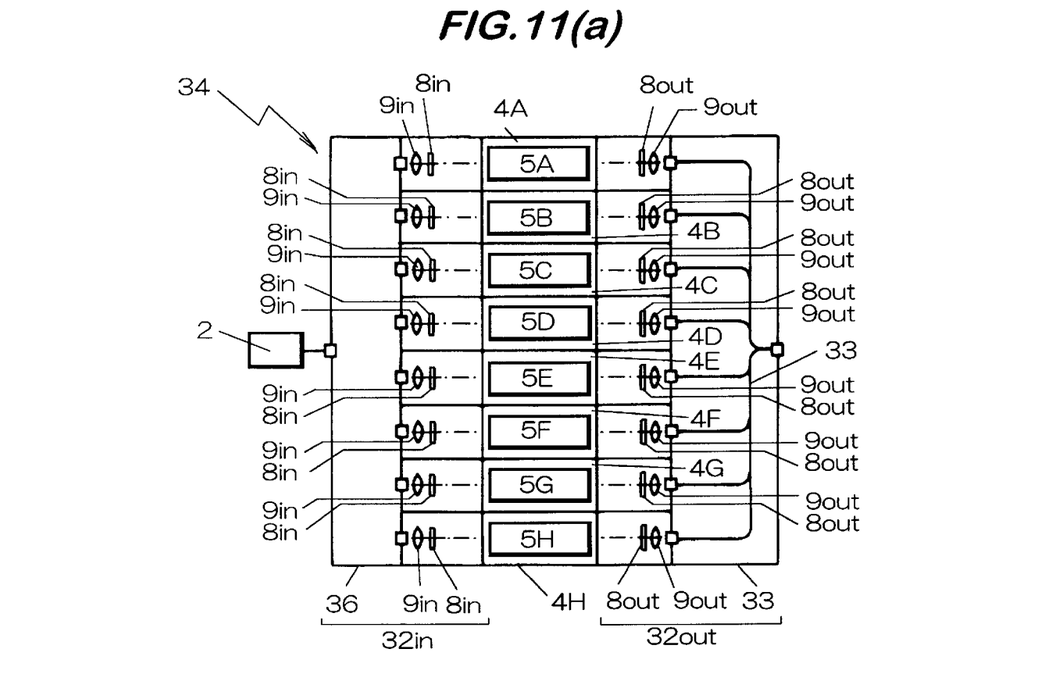
FIGS. 11(a) and 11(b) are cross sectional views illustrating a further embodiment of the present invention.

FIGS. 11(a) and (b) show optical spectral spacers 34 and 35 capable of outputting an optional light from 8 kinds of discontinuous spectrum lights. Portions in common with those in FIG. 1 and FIG. 10 carry the same reference numerals, for which duplicate explanations will be omitted.

An optical spectrum slicer 34 shown in FIG. 11(a) has an optical channel switching unit 36 such as a 1×8 optical switch for selectively switching eight optical channels of an incident optical system 32in from an optical source 2 to each of birefringent devices 5A to 5H.

In this constitution, a broad band continuous spectrum light irradiated from the optical source 2 can be entered selectively by way of the optical channel switching unit 36 to one of the birefringent devices 5A–5H to emit one kind of discontinuous spectrum lights. In this embodiment, the light from the optical source 2 is not branched to each of the birefringent devices 5A to 5H and most of the light is entered to one of the birefringent devices 5A and 5H although there is a little optical loss in the incident optical system 32in and the optical channel switching unit 36, so that the optical intensity of the outputted discontinuous spectrum lights is high.

The incident optical system 32in is not restricted only to the illustrated embodiment but the eight external optical connectors for input and the incident end 5in of each of the birefringent devices 5A to 5H may be connected by individual optical fibers.

Figure 11B:
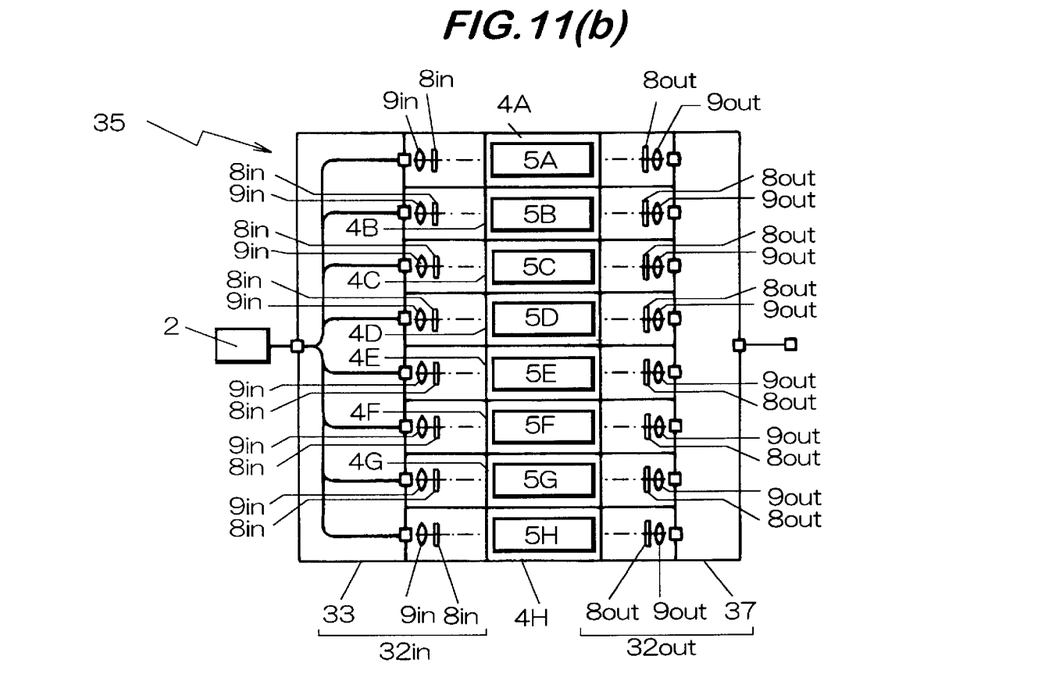

An optical spectrum slicer 35 shown in FIG. 11(b) has an optical channel switching unit 37 such as a 8×1 optical switch for selectively switching eight optical channels of the emission optical system 32out from each of the birefringent devices 5A to 5H to the emitting end.

In this constitution, a broad band continuous spectrum light irradiated from the optical source 2 is entered to each of the birefringent devices 5A to 5H and eight kinds of discontinuous spectrum lights are outputted simultaneously and a kind of discontinuous spectrum light can be emitted selectively by the optical channel switching unit 37.

In the same manner as the incident optical system 32in described above, the emission end 5out of each of the birefringent devices 5A to 5H and eight external optical connectors for output may be connected by individual optical fibers also in the emission optical system 32out.

As has been described above, the present invention can provide excellent effects capable of outputting discontinuous spectrum lights having a desired wavelength spacing without using special optical source or filter but by an extremely simple constitution and at a reduced cost, by merely transmitting a broad band continuous spectrum light through the birefringent device, as well as capable of reliably matching the wavelength of the spectral component with a desired standard wavelength by controlling the temperature of the birefringent device.

What is claimed is:

1. An optical spectrum slicer for converting a broad band continuous spectrum light source having an optional wavelength region into discontinuous spectrum lights and outputting them wherein the slicer comprises:

a birefringent device having two polarization axes each orthogonal to an optical axis and linear polarizers disposed at the light incident end and the light emission end of the birefringent device, with the direction of polarization being inclined by about 45° relative to each of polarization axes, and a heat generator for variably controlling each of wavelengths while maintaining the wavelength spacing of discontinuous spectrum lights by controlling the temperature of the birefringent device.

2. An optical spectrum slicer as defined in claim 1, wherein a pair of optical connectors to be connected with an optical fiber for entering a broad band continuous spectrum light and an optical fiber for emitting discontinuous spectrum lights are attached to both ends of a housing incorporating the birefringent device coaxial with the optical axis (z) of the birefringent device.

3. An optical spectrum slicer as defined in claim 1, wherein the slicer comprises a reflection mirror for reflecting a light emitted from the birefringent device and transmitting the polarizer along the optical axis (z) and again entering by way of the polarizer to the birefringent device.

4. An optical spectrum slicer as defined in claim 3, wherein an optical connector to be connected with optical fiber both for inputting and emitting use is attached to the housing incorporating the birefringent device coaxial with the optical axis (z) of the birefringent device.

5. An optical spectrum slicer as defined in claim 1, wherein the slicer comprises a wavelength controller adapted to detect the wavelength of an optional spectral component contained in the discontinuous spectrum light, compare the detected wavelength with a predetermined reference wavelength and apply feedback control to the temperature of heat generator such that they are identical with each other.

6. An optical spectrum slicer for converting a broad band continuous spectrum light having an optional wavelength region into discontinuous spectrum lights having a plurality of different wavelength spacings and outputting the same, wherein the slicer comprises;

a plurality of birefringent devices each having two polarized axes (x, y) perpendicular to the optical axis (z), with the product of the birefringence ($\Delta n$) and the length (L) in the direction (z) being different from each other, an incident optical system for entering a broad band continuous spectrum light irradiated from one optical source to each of the birefringent devices and an emitting optical system for emitting discontinuous spectrum lights outputted from each of the birefringent devices, and wherein each of the birefringent devices is different in the product of birefringence and length, and has linear polarizers each disposed to a light incident end and a light emitting end, with the direction of polarization being inclined at about 45° relative to the polarized light axis (x, y), and a heat generator for controlling the temperature of each of the birefringent devices, thereby variably adjusting each of the wavelengths while maintaining the wavelength spacing of the discontinuous spectrum lights.

7. An optical spectrum slicer as defined in claim 6, wherein an optical channel switching unit is disposed to the incident optical system for selectively entering the broad band continuous spectrum light to each of the birefringent devices.

8. An optical spectrum slicer as defined in claim 6, wherein an optical channel switching unit is disposed to the emitting optical system for selectively outputting the discontinuous spectrum lights of different wavelength spacings outputted from each of the birefringent devices.

9. An optical spectrum slicer as defined in claim 2, wherein the slicer comprises a wavelength controller adapted to detect the wavelength of an optional spectral component contained in the discontinuous spectrum light, compare the detected wavelength with a predetermined reference wavelength and apply feedback control to the temperature of heat generator such that they are identical with each other.

10. An optical spectrum slicer as defined in claim 3, wherein the slicer comprises a wavelength controller adapted to detect the wavelength of an optional spectral component contained in the discontinuous spectrum light, compare the detected wavelength with a predetermined reference wavelength and apply feedback control to the temperature of heat generator such that they are identical with each other.

11. An optical spectrum slicer as defined in claim 4, wherein the slicer comprises a wavelength controller adapted to detect the wavelength of an optional spectral component contained in the discontinuous spectrum light, compare the detected wavelength with a predetermined reference wavelength and apply feedback control to the temperature of heat generator such that they are identical with each other.

* * * * *